Dec. 8, 1953  P. POULENC ET AL  2,662,088
PROCESS OF PURIFYING DEHYDROCHOLIC ACID
Filed March 29, 1952

INVENTORS:
PIERRE POULENC
BERNARD GAUTHIER
GEORGES MARIE EMILE ALOYS KIRCHHOFFER
By
Richardson, David and Nordon
Att'ys Patented Dec. 8, 1953

2,662,088

UNITED STATES PATENT OFFICE 2,662,088

PROCESS OF PURIFYING DEHYDROCHOLIC ACID

Pierre Poulenc, Paris, Bernard Gauthier, Antony, and Georges Marie Emile Aloys Kirchhoffer, Paris, France, assignors to Societe: Chimie et Atomistique, Paris, France, a French body corporate Application March 29, 1952, Serial No. 279,438

Claims priority, application France April 20, 1951

9 Claims. (Cl. 260—397.1)

The present invention relates to a process of purifying dehydrocholic acid.

It is known that this acid is obtained by conversion of cholic acid itself extracted from bovine bile which contains normally 3 to 3.5% of cholic acid or 3, 7, 12 trihydroxy cholanic acid (Fig. I of annexed drawing) apart from quantities seven to eight times weaker of desoxycholic acid, or 3, 12 dihydroxy cholanic acid and traces of other related hydroxyl cholanic acids.

Figure 1:
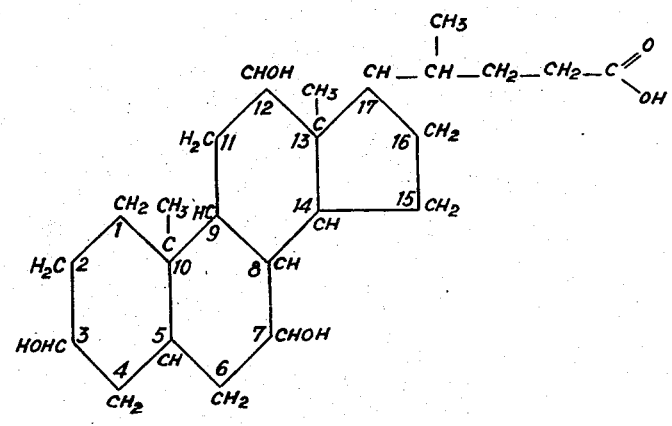
Figure 2:
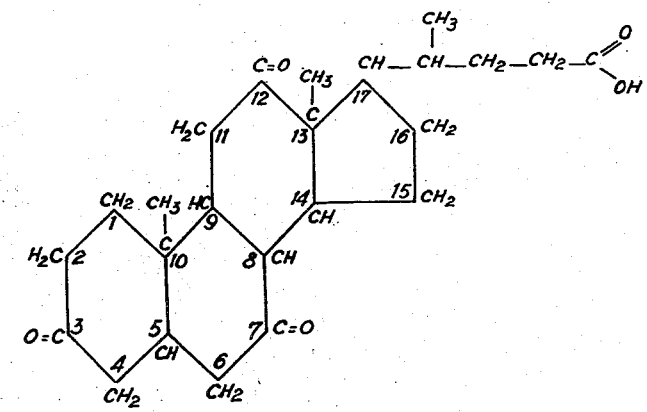

Dehydrocholic acid or 3, 7, 12 keto cholanic acid (Fig. 2) which is of great therapeutical value if obtained by direct oxydation of three hydroxyl functions of cholic acid into ketonic groupings. To obtain this product pure, pure cholic acid is required the preparation of which is costly due to the large losses occurring during purification. In practice, therefore, it is more advantageous to start with a commercial cholic acid, but the obtained product is polluted with 3, 12 diketo cholanic acid coming from the oxydation of the principal impurity of cholic acid namely, desoxycholic acid, and also with oxidized biliary pigments that give to the alkaline solutions of dehydrocholic acid an intense yellow or brown colour.

The invention has for its object to remedy these drawbacks by means of a particularly easy and effective process of purifying dehydrocholic acid.

It has not been discovered that biliary acids possessing a ketonic function at position 3, in an alkaline medium combine with aliphatic halogenated hydrocarbon.

This property may be likened to the action of chloroform on aldehydes and ketones represented by the formula:

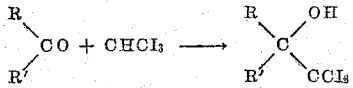

These compounds are, however stable, unlike compounds of biliary acids with halogenated hydrocarbons which are themselves very unstable and due to this regenerate very easily the starting biliary acid.

This property is particularly interesting in the case of dehydrocholic acid for the combinations of this acid with aliphatic halogenated hydrocarbons, are insoluble in water, as opposed to the analogous combinations of other biliary acids having a ketonic function at position 3. The insolubility in water of the dehydrocholic acid-halogenated hydrocarbon combination permits, then, the easy isolation of dehydrocholic acid in a complex mixture of biliary acids. Indeed, in this complex mixture, the biliary acids not having a ketonic grouping at position 3, do not react with halogenated hydrocarbons and remain dissolved in the water, the biliary acids having a ketonic grouping at position 3 with the exception of dehydrocholic acid yield with these hydrocarbons combinations soluble in water, and alone precipitate the dehydrocholic acid-halogenated hydrocarbon combination which can then be separated.

The dehydrocholic acid may then be recovered in a high state of purity from this combination by decomposing it with excess hot water.

The invention, therefore, has for its object to provide a process of purifying dehydrocholic acid, which comprises treating said acid in the impure state with an alkaline aqueous solution, wherein it is dissolved in the form of its alkaline salt, thereafter adding to said solution at least one aliphatic halogenated hydrocarbon, thereby precipitating an addition compound of halogenated hydrocarbon-dehydrocholic acid, thereafter separating this precipitate decomposing it with excess hot water thereby regenerating the alkaline salt of said acid, and lastly liberating the dehydrocholic acid in the pure state by acidification.

When the dehydrocholic acid to be purified includes another biliary acid as an impurity, the combination formed by the impurity with a halogenated hydrocarbon remains in solution, and this is also true for the biliary pigments not affected by this reaction. The process in accordance with the invention permits, therefore, to isolate in the form of an insoluble precipitate the dehydrocholic acid to be purified.

In order to obtain an optimum yield and quality during the purification, certain conditions of concentration must be fulfilled which depend on the ensuing considerations. In a diluted medium, the yield of the purification is insufficient and in a medium too concentrated the precipitate formed is very voluminous, and it is difficult to separate from the impurities, and in consequence the depigmentation is partial.

Preferably, therefore, the concentration of biliary acid in the aqueous alkaline solution is chosen between 20 and 25%, its solubility being furthermore diminished if necessary by "salting" with a corresponding alkaline salt such as ClNa or ClK.

In this case, the coloured filtrate obtained after draining of the halogenated hydrocarbon-dehydrocholic acid combination may still contain less pure dehydrocholic acid. This filtrate may then be subjected to an analogous operation or purified by crystallization in alcohol or other solvent according to the purity desired. To collect the precipitate, it may be advantageous to allow it to stand 24 hours in a refrigerator before draining it. The decomposition of the addition compound halogenated hydrocarbon-dehydrocholic acid by water is very easily effected. This is already happening cold with a large amount of excess water, but it is more rapid when the temperature of the water rises, the alkaline salt dissolving in the water, as it is liberated. It is then very easy to liberate the biliary acid which precipitates by acidification by any convenient acid.

As halogenated aliphatic hydrocarbons which may be used in the process of the invention, may be mentioned among others: chloroform, dichlorethane, carbon tetrachloride, trichlorethylene, ethyl bromide etc.

In order to effect a good precipitation of the addition compound, the halogenated hydrocarbon is used in a proportion at least molecularly equivalent to the treated biliary acid.

In order to render the invention more clear, several non-limitative modes of carrying out the invention will follow.

In the various examples, the amounts of the different reactives are expressed in molar equivalents with respect to the amount of dehydrocholic acid employed, the latter being taken each time as unity.

Example 1

60 gr. (1 part) of commercial dehydrocholic acid (melting point above 215° C.) are dissolved in a solution of 6 gr. of sodium hydroxide (1 part) in 200 cc. of purified water. The addition of 18 gr. (1 part) of chloroform provokes the immediate formation of the insoluble combination, which is left 24 hours in a refrigerator, drained, and washed with a saturated aqueous solution of sodium chloride.

The precipitate is treated with 900 cc. of purified water. It is slowly dissolved cold, much more rapidly upon heating, liberating chloroform. The obtained solution, substantially uncoloured, filtered, then precipitated by dilute acetic acid, gives after drying, 26 gr. of dehydrocholic acid (melting point 237°–238° C.).

The coloured filtrate obtained after draining is precipitated by acetic acid and gives coloured dehydrocholic acid (melting point 210° C.) which is subsequently utilized.

Example 2

80 gr. (1 part) of commercial dehydrocholic acid (melting point above 215° C.) are dissolved in a solution of 11.2 gr. (1 part) of potassium hydroxyde in 250 cc. of purified water. The addition of 30 gr. of 1,2-dichlorethane (1.5 part) provokes the immediate precipitation of the addition combination, which is left 24 hours in a refrigerator, drained, and washed with an aqueous solution saturated with potassium chloride. The precipitate is treated with 1200 cc. of purified water. It is slowly dissolved cold, then rapidly upon heating, liberating dichlorethane. The rather uncoloured solution obtained is filtered, then precipitated by dilute hydrochloric acid. After drying, 41 gr. of dehydrocholic acid (melting point 237–238° C.) are recovered.

The coloured filtrate precipitated by the dilute hydrochloric acid yields impure and coloured dehydrocholic acid (melting point 215–217° C.) which is utilized in a subsequent operation.

Example 3

60 gr. (1 part) of commercial dehydrocholic acid (melting point 229° C.) are dissolved in a solution of 6 gr. of sodium hydroxide (1 part) in 200 cc. of purified water. The addition of 35 gr. of carbon tetrachloride (1.5 part) provokes the immediate formation of the insoluble combination, which is left 24 hours in a refrigerator, drained, and washed with an aqueous solution saturated with sodium chloride. The precipitate is treated with 1000 cc. of purified water. It is slowly dissolved cold, much more rapidly upon heating, liberating carbon tetrachloride. The rather colourless solution obtained is filtered, then precipitated by dilute hydrocholic acid, yields after drying, 33 gr. of dehydrocholic acid (melting point 238° C.).

The coloured filtrate precipitated by dilute acetic acid gives a less pure dehydrocholic acid (melting point 224° C.) which is purified by the same process.

Example 4

50 gr. (1 part) of commercial dehydrocholic acid (melting point 222° C.) is dissolved in a solution of 5 gr. (1 part) of sodium hydroxide in 200 cc. of distilled water. The addition of 13.4 gr. of trichlorethylene (1 part) provokes the immediate precipitation of the required combination which is left one night in the cold then drained and washed with an aqueous solution saturated with sodium chloride.

The precipitate treated with 900 cc. of distilled water is slowly dissolved cold, much more rapidly upon heating, liberating trichlorethylene. The rather coloured solution obtained, filtered, then precipitated by dilute acetic acid, yields, after drying, 25 gr. of dehydrocholic acid (melting point 238° C.). The coloured filtrate precipitated by dilute acetic acid gives a yellowish dehydrocholic acid (melting point 214° C.) which is utilized in a subsequent operation or purified by alcoholic crystallization.

Example 5

50 gr. (1 part) of commercial dehydrocholic acid (melting point 215° C.) are dissolved in a solution containing 5 gr. (1 part) of sodium hydroxide in 200 cc. of purified water. The addition of 20.5 gr. (1.5 part) of ethyl bromide provokes the immediate precipitation of the required combination which is left one night in the cold, then drained and washed with a saturated solution of sodium chloride. The precipitate treated with 900 cc. of purified water is dissolved slowly cold, much more rapidly upon heating, liberating ethyl bromide. The rather colourless solution obtained is filtered then precipitated by dilute acetic acid. After drying, 26 gr. of dehydrocholic acid (melting point 237–238° C.) are recovered.

The coloured filtrate, precipitated by dilute hydrochloric acid yields a yellowish dehydroholic acid (melting point 212° C.) which is purified by crystallization in alcohol at 80° C.

Example 6

100 gr. (1 part) of dehydrocholic acid (melting point 235° C.) are dissolved in an ammonia solution prepared by adding to 400 cc. of purified water 25 gr. of ammonia at 20%. The solution is thereafter added to ammonium chloride until a light insoluble part appears. The addition of 30 gr. of chloroform (1 part) provokes the immediate precipitation of the required combination. After being left for 1 hour, the crystals are drained, and washed with a concentrated solution of ammonium chloride. The coloured filtrate is conserved. The precipitate treated by 2300 cc. of purified water is dissolved in a water-bath. The obtained solution is filtered then precipitated by dilute acetic acid. After drying, 80 gr. of dehydrocholic acid (melting point 237–238° C.) are recovered.

There is recovered by precipitation from the coloured filtrate the yellowish dehydrocholic acid, which is purified subsequently by the same process.

*Example 7*

500 gr. (1 part) of dehydrocholic acid (melting point 229–230° C.) are dissolved in a solution containing 50 gr. (1 part) of sodium hydroxide in 2000 cc. of purified water. The solution is added to sodium chloride until a precipitate of sodium dehydrocholate ("salting") appears.

The addition of 165 gr. (1.1 parts) of chloroform provokes the immediate formation of the insoluble combination, which is drained after being left several hours, washed with a saturated aqueous solution of sodium chloride, then redissolved in 12 litres of hot purified water. The obtained solution is precipitated by dilute acetic acid. About 400 gr. of dry dehydrocholic acid (melting point 235–236° C.) are recovered. The coloured filtrate is added to sodium chloride (which permits a little more of the combination to be recovered), and therefrom the dehydrocholic acid of equivalent melting point. The coloured juice is lastly precipitated by dilute acetic acid and is crystallized in alcohol at 80° C. then treated by the same process.

Several similar operations permit 351 gr. of dehydrocholic acid (melting point 238–239° C.) to be obtained constituting a total yield of 70%.

The invention is not limited to the described modes of carrying out the invention which were given by way of example. For instance, the aforementioned aliphatic hydrohalogenated carbons may be replaced by others without affecting the result.

Having now described our invention what we claim as new and desire to secure by Letters Patent is:

1. Process of purifying dehydrocholic acid that comprises the steps of treating said dehydrocholic acid in the impure state with an aqueous alkaline solution wherein it is dissolved in the form of its alkaline salt, thereafter adding to this solution at least one halogenated aliphatic hydrocarbon thereby precipitating therefrom an addition compound of halogenated hydrocarbon-dehydrocholic acid, thereafter separating this precipitate, thereafter decomposing it by excess hot water thereby regenerating the alkaline salt of said acid, thereafter liberating this dehydrocholic acid in the pure state by acidification.

2. Process of purifying dehydrocholic acid as claimed in claim 1, in which the concentration of said dehydrocholic acid with respect to said alkaline solution is comprised between 20 and 25%.

3. Process of purifying dehydrocholic acid as claimed in claim 1, in which said halogenated hydrocarbon is utilized in a proportion at least molecularly equivalent to said dehydrocholic acid.

4. Process of purifying dehydrocholic acid as claimed in claim 1, in which said halogenated hydrocarbon is chloroform.

5. Process of purifying dehydrocholic acid as claimed in claim 1, in which said halogenated hydrocarbon is dichlorethane.

6. Process of purifying dehydrocholic acid as claimed in claim 1, in which said halogenated hydrocarbon is carbon tetrachloride.

7. Process of purifying dehydrocholic acid as claimed in claim 1, in which said halogenated hydrocarbon is trichlorethylene.

8. Process of purifying dehydrocholic acid as claimed in claim 1, in which said halogenated hydrocarbon is ethyl bromide.

9. Process of purifying dehydrocholic acid that comprises the steps of treating said dehydrocholic acid in the impure state with an aqueous alkaline solution, wherein it is dissolved in the form of its alkaline salt, said acid being at a concentration comprised between 20 and 25% with respect to said alkaline solution, thereafter adding to this solution at least one halogenated aliphatic hydrocarbon in a proportion at least molecularly equivalent to said dehydrocholic acid, thereby precipitating therefrom an addition compound of halogenated hydrocarbon-dehydrocholic acid, thereafter separating this precipitate, thereafter decomposing it by an excess of hot water thereby regenerating the alkaline salt of said dehydrocholic acid, and thereafter liberating this dehydrocholic acid in the pure state by acidification.

PIERRE POULENC.
BERNARD GAUTHIER.
GEORGES MARIE EMILE
    ALOYS KIRCHHOFFER.

No references cited.